Patented Dec. 29, 1931

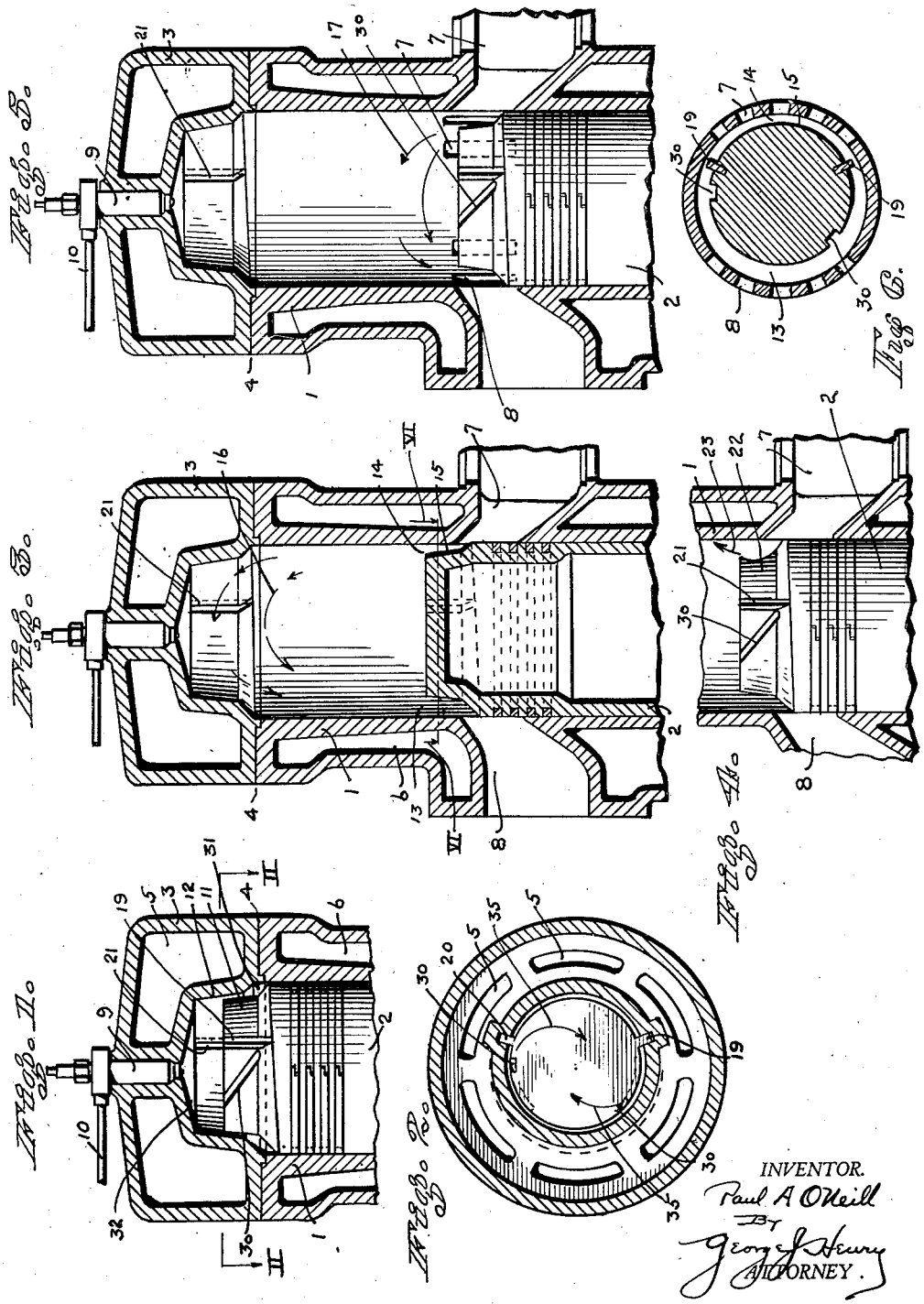

1,838,495

UNITED STATES PATENT OFFICE

PAUL A. O'NEILL, OF SAN FRANCISCO, CALIFORNIA

INTERNAL COMBUSTION ENGINE

Application filed October 23, 1929. Serial No. 401,912.

My invention has for its object means and method of construction and of operation of internal combustion engines, and particularly the scavenging of cylinders of such engines following the fuel burning and expansion stroke.

It is well known that in engines of the internal combustion type the burned and expanded mixture must, to attain efficient operation, be very rapidly and entirely removed from the cylinder upon the opening of the exhaust ports when the piston is at the end of its stroke and that the inrushing scavenging air which is later to be compressed, must be kept separate as far as possible from the burnt gases being scavenged.

In other words the air entering must be retained as far as possible, unmixed with the burned gases and which are being forced out thereby.

In my invention, the construction of the cylinder and piston, the ports and passages are particularly arranged with this thought in mind, and by its use I secure a more efficient scavenging of the burned gases and therefore a most efficient use of the fuel mixture with the air which has been previously employed in scavenging and which is later compressed and then burned in cycle.

A further object of my invention is a more efficient cooling of that portion of the cylinder in which the highest heat of the burning mixture is concentrated.

Other objects will appear from the drawings and specifications which follow.

Referring to the drawings:

Fig. 1 is a vertical cross section of an upper portion of one of the cylinders of an engine employing my invention.

Fig. 2 is a section of Fig. 1 with the piston positioned in the upper part of the cylinder on the line II—II thereof.

Fig. 3 is a vertical cross section through the cylinder of Fig. 1 with the piston shown in the lower position.

Fig. 4 is a cross section of the cylinder with the piston shown in perspective corresponding with parts in the same position as Fig. 3.

Fig. 5 is similar to Fig. 3 except that the piston is shown in its lowest possible position.

Fig. 6 is a cross section through the cylinder and piston on the line VI of Fig. 3 to show the inlet and discharge areas respectively.

Throughout the figures similar numerals refer to identical parts.

In the figures, the numeral 1 indicates the cylinder body of a conventional two cycle internal combustion engine, certain of the parts not being shown, although well-known.

The piston is shown by the numeral 2, adapted to reciprocate within the cylinder.

A cylinder head is shown at 3 within which is formed an upper portion of the cylinder compartment and which is joined with the cylinder body at the joint 4.

Water passages in the cylinder head are shown at 5, 5, and in the cylinder at 6, 6, adapted to cool the cylinder and head in the conventional manner.

Inlet ports for scavenging air is shown at 7, 7 and discharge ports at 8, 8.

The inlet ports open into the cylinder compartment preferably slightly above the outlet ports.

Fuel is introduced in a conventional manner through the valve 9 and supply pipe 10, whereby fuel under pressure is introduced and burned with the air content of the cylinder which has been appropriately compressed when the parts are in the position shown in Fig. 1.

On the upper portion of the piston is shown an eccentrically positioned portion 11 adapted, when the piston is in its upper position, to pocket within the corresponding portion 12 within the cylinder head.

When the piston is in the lower position within the cylinder body 1, as shown in Figs. 3, 4, 5, a greater space 13 is provided on the discharge side of the piston than the space on the inlet side at 14, because of the aforesaid eccentrically positioned piston upper portion.

It will be noted that the upper eccentrically formed portion of the piston provides a sloping wall at 15, against which the inrushing scavenging air from the ports 7, 7 is diverted upward and follows the path as shown by the arrows 16, 16, sweeping out the burned mixture from the upper part of the cylinder and that as the piston descends from the position of Fig. 3, to the position of Fig. 5, the in-rushing scavenging air, sweeps the lower portions of the cylinder free from the burned gases as shown by the arrows 17, 17.

In order to prevent a circulation around the piston upper portion 11 from the inlet portion 14 to the outlet portion 13, and to insure an upward direction of the in-rushing air, I prefer to introduce the wings or deflectors 19, 20 on each side of the inlet ports and for these wings appropriate pockets are provided in the cylinder head, one of which is shown at 21.

Moreover, in the upper part of the piston I prefer to provide angular channels 30, 30, such that as the piston moves up into the position shown in Fig. 1, and especially during the final period of compression, and when the fuel spray is being injected from the valve 9, the compressed air and fuel spray are thoroughly intermixed, because of the rotary motion resulting from the air rushing into the explosion space 32, from the space 31 through said channels 30, 30, see Figs. 2 and 5.

This rotary movement which takes place in the explosion space 32 results in a quicker and more complete burning of the fuel and therefore a more efficient transformation of energy. This rotary movement of the compressed and now burning mixture is indicated by the arrows 35, 35, in Fig. 2.

Where the piston speed is unusually high and the length of stroke long, I have found it advantageous to form a portion of the upper portions of the piston concave, as shown at 22, whereby the first in-rushing air takes the direction of the arrow 23, thereafter impinging upon the cylinder wall and sweeping upward as shown by the arrows 16, 16, see Figs. 3 and 4.

It will be noted from Fig. 5 that the air inlet ports 7, 7 are uncovered slightly before the discharge ports 8, 8, on the downward movement; and on the upward movement the discharge ports are covered slightly before the inlet ports.

The path of the air as shown consecutively by the arrows 16, 16, and 17, 17 sweeps the burned mixture entirely from the cylinder through the enlarged area 13 and ports 8, 8, and as soon as this has been accomplished, the piston, during its return stroke covers the discharge ports and immediately thereafter the inlet ports entrapping therein a complete charge of air. This is subsequently compressed and employed in burning the fuel injected from the valve 9, during the following cycle.

By directing the scavenging air as shown by the arrows the cylinder walls are cooled, pockets in which burned gases would otherwise be retained are cleared of their burned gases, and the burned mixture from the interior of the cylinder is, during the lower position of the piston fully discharged, see Fig. 3.

Moreover, the position of the upper portion of the piston even in its lowest position is interposed between the inlet ports 7, 7 and outlet ports 8, 8, thus preventing any direct cross discharge of entering air through the exhaust ports before the piston has commenced its return stroke.

Particular attention is directed to the eccentrically shaped annular space formed by the upper portion of the piston formed off center or eccentrically as described above; in its cooperation with the cylinder walls and especially during the lower portions of its movement, in cooperation with the inlet and outlet ports, as best shown in Figs. 3, 4, 5 and 6, whereby the above sweeping out or scavenging of the cylinder is most effectively attained.

I claim:

1. In an internal combustion engine, a cylinder having a conical shaped pocket at its top end, the said pocket being provided with slots in its side walls, a piston mounted in the cylinder having a conical shaped top portion adapted to fit within the pocket of the cylinder, wing means carried by the top portion of the piston and adapted to fit inside the slots of the pocket when the piston is in one of its extreme positions, and air inlet and outlet ports located in the cylinder at points on opposite sides of the wing means.

2. In an internal combustion engine, a cylinder having a cylinder head thereon, the said head having a conical shaped pocket which is provided with slots in its side walls, a piston mounted in the cylinder having a conical shaped top portion adapted to fit within the pocket of the cylinder head, and wing means carried by the top portion of the piston and adapted to fit inside the slots of the pocket when the piston is in one of its extreme positions, and air inlet and outlet ports located in the cylinder at points on opposite sides of the wing means.

PAUL A. O'NEILL.